(12) United States Patent
Ito et al.

(10) Patent No.: US 11,796,995 B2
(45) Date of Patent: Oct. 24, 2023

(54) VEHICLE WITH PRESENTATION DEVICE

(71) Applicant: TOYOTA JIDOSHA KABUSHIKI KAISHA, Toyota (JP)

(72) Inventors: Yuki Ito, Iwakura (JP); Tsukasa Nakanishi, Nagoya (JP); Yuta Morikawa, Miyoshi (JP); Naoki Yamamuro, Nagoya (JP); Yuki Tatsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 16/914,559

(22) Filed: Jun. 29, 2020

(65) Prior Publication Data

US 2021/0026345 A1 Jan. 28, 2021

(51) Int. Cl.
*G05D 1/00* (2006.01)
*B60W 40/02* (2006.01)
(Continued)

(52) U.S. Cl.
CPC ........... *G05D 1/0016* (2013.01); *B60R 25/01* (2013.01); *B60R 25/305* (2013.01); *B60W 40/02* (2013.01);
(Continued)

(58) Field of Classification Search
CPC ... G05D 1/0016; G05D 1/0061; B60W 40/02; B60W 2556/45; B60W 60/00253; B60W 60/0015; B60W 50/14; B60W 60/0025; B60W 2050/146; B60W 2540/041; B60W 2540/043; B60W 60/005; B60W 60/0059; B60R 25/01; B60R 25/305; B60R 25/24; G01C 21/3407; G06Q 10/08; G06Q 30/0645; G06Q 50/28; G06Q 50/30
See application file for complete search history.

(56) References Cited

U.S. PATENT DOCUMENTS 9,881,503 B1 * 1/2018 Goldman-Shenhar ....................... G05D 1/0088
9,928,734 B2 * 3/2018 Newman ................ G08G 1/005
(Continued)

FOREIGN PATENT DOCUMENTS

| JP | 2016-115364 A | 6/2016 |
|---|---|---|
| JP | 2017-174208 A | 9/2017 |
| JP | 2019-121049 A | 7/2019 |

*Primary Examiner* — Nga X Nguyen
(74) *Attorney, Agent, or Firm* — Oliff PLC

(57) ABSTRACT

A vehicle including: a communication section configured to receive operation information to operate a travel device from an external operation device; a memory; and a processor coupled to the memory, the processor being configured to: acquire peripheral information peripheral to a vehicle body from a peripheral information detection section, generate a travel plan based on the peripheral information, and control the travel device so as to perform autonomous driving in which travel is based on the generated travel plan, and perform remote driving in which travel is based on the operation information received by the communication section; and the vehicle further comprising a presentation device configured to present, at a vehicle exterior, identifying information received by the communication section, the identifying information relating to a user making use of transportation by the autonomous driving or the remote driving.

8 Claims, 12 Drawing Sheets

(51) Int. Cl.
  *G01C 21/34* (2006.01)
  *B60W 60/00* (2020.01)
  *B60W 50/14* (2020.01)
  *B60R 25/01* (2013.01)
  *B60R 25/30* (2013.01)

(52) U.S. Cl.
  CPC ........ *B60W 50/14* (2013.01); *B60W 60/0025* (2020.02); *G01C 21/3407* (2013.01); *B60W 2050/146* (2013.01)

(56) References Cited

U.S. PATENT DOCUMENTS

| | | | |
|---|---|---|---|
| 9,964,948 B2 | 5/2018 | Ullrich et al. | |
| 10,289,922 B1* | 5/2019 | Wengreen | G08G 1/202 |
| 10,843,622 B2* | 11/2020 | Lee | G06K 9/00805 |
| 2017/0008490 A1 | 1/2017 | Sako et al. | |
| 2017/0153714 A1* | 6/2017 | Gao | G06K 9/00798 |
| 2017/0308082 A1* | 10/2017 | Ullrich | G05D 1/0061 |
| 2017/0327082 A1* | 11/2017 | Kamhi | B60H 1/00357 |
| 2018/0039917 A1* | 2/2018 | Buttolo | B60W 60/00253 |
| 2018/0053412 A1* | 2/2018 | Lagnemma | G05D 1/0088 |
| 2018/0074494 A1* | 3/2018 | Myers | H04W 4/029 |
| 2018/0075565 A1* | 3/2018 | Myers | G05D 1/0088 |
| 2018/0174460 A1* | 6/2018 | Jung | B60Q 1/085 |
| 2018/0188731 A1* | 7/2018 | Matthiesen | G01C 21/3664 |
| 2018/0364696 A1* | 12/2018 | Lavoie | B60W 30/06 |
| 2019/0072964 A1* | 3/2019 | Nix | G01C 21/3415 |
| 2019/0197325 A1* | 6/2019 | Reiley | G08B 21/24 |
| 2019/0359128 A1* | 11/2019 | Harper | B60Q 5/006 |
| 2020/0202142 A1* | 6/2020 | To | G05D 1/0088 |
| 2020/0262454 A1* | 8/2020 | Uehara | G05D 1/0088 |
| 2020/0272143 A1* | 8/2020 | Scott | G06Q 10/02 |
| 2020/0285240 A1* | 9/2020 | Diehl | G06F 21/35 |
| 2020/0334581 A1* | 10/2020 | Skaling | G06Q 10/02 |
| 2020/0409358 A1* | 12/2020 | Gogna | G05D 1/0088 |

* cited by examiner

VEHICLE WITH PRESENTATION DEVICE

CROSS-REFERENCE TO RELATED APPLICATION

This application is based on and claims priority under 35 USC 119 from Japanese Patent Application No. 2019-135244 filed on Jul. 23, 2019, the disclosure of which is incorporated by reference herein.

BACKGROUND

Technical Field

The present disclosure relates to a vehicle capable of autonomous driving and remote driving.

Related Art

U.S. Pat. No. 9,964,948 discloses a vehicle that is capable of autonomous driving, and that is also capable of implementing remote driving by a remote operator in order to assist autonomous driving.

Were a vehicle such as that described in U.S. Pat. No. 9,964,948 to be employed to collect a passenger or receive a package, it may not be clear to a person whether they should board the vehicle or load a package if there is no occupant present.

SUMMARY

An object of the present disclosure is to provide a vehicle that enables a person outside the vehicle to ascertain whether or not they may board or load a package onto the vehicle, even when there is no occupant present.

A first aspect is a vehicle including a communication section configured to receive operation information to operate a travel device from an external operation device, an acquisition section configured to acquire peripheral information peripheral to a vehicle body from a peripheral information detection section, a travel plan generation section configured to generate a travel plan based on the peripheral information, a travel control section configured to control the travel device so as to perform autonomous driving in which travel is based on the travel plan generated by the travel plan generation section, and perform remote driving in which travel is based on the operation information received by the communication section, and a presentation device configured to present, at a vehicle exterior, identifying information received by the communication section, the identifying information relating to a user making use of transportation by the autonomous driving or the remote driving.

The vehicle of the first aspect is capable of implementing autonomous driving and remote driving by the travel control section controlling the travel device. The autonomous driving is travel based on the peripheral information acquired from the peripheral information detection section by the acquisition section and the travel plan generated by the travel plan generation section. The remote driving is travel based on the operation information transmitted from the operation device and received by the communication section.

In this vehicle, when the communication section has received the identifying information relating to the user making use of transportation by the autonomous driving or the remote driving (namely, a user of the vehicle), the presentation device is configured to present the identifying information at the vehicle exterior. The vehicle thus enables the user of the vehicle to be identified based on the presented identifying information even in cases in which there is no occupant (such as a vehicle owner or driver) on board. This enables the person outside the vehicle to ascertain whether or not to they may board or load a package onto the vehicle, even when there is no occupant present.

A vehicle of a second aspect is the vehicle of the first aspect, wherein the presentation device includes a display device configured to display an image of the user as the identifying information.

The vehicle of the second aspect includes the display device as the presentation device, and the identifying information includes the image of the user of the vehicle. This vehicle displays the image of the user at the vehicle exterior in order to enable the person outside the vehicle to ascertain the user visually.

A vehicle of a third aspect is the vehicle of the first aspect or the second aspect, wherein the presentation device includes a speaker configured to output audio of the user as the identifying information.

The vehicle of the third aspect includes the speaker as the presentation device, and the identifying information includes the audio of the user of the vehicle. This vehicle outputs the audio of the user at the vehicle exterior in order to enable the person outside the vehicle to ascertain the user aurally.

A vehicle of a fourth aspect is the vehicle of any one of the first aspect to the third aspect, further including a door section provided at the vehicle body, a locking section configured to lock and unlock the door section, and an authentication section configured to perform authentication to cause the locking section to perform unlocking based on information from outside the vehicle.

In the vehicle of the fourth aspect, the door section locked by the locking section is configured capable of being unlocked on the basis of authentication by the authentication section. This vehicle thereby enables boarding of a passenger unconnected to the user or loading of a package unconnected to the user to be prevented.

The present disclosure enables a person outside the vehicle to ascertain whether or not they may board or load a package onto the vehicle, even when there is no occupant present.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
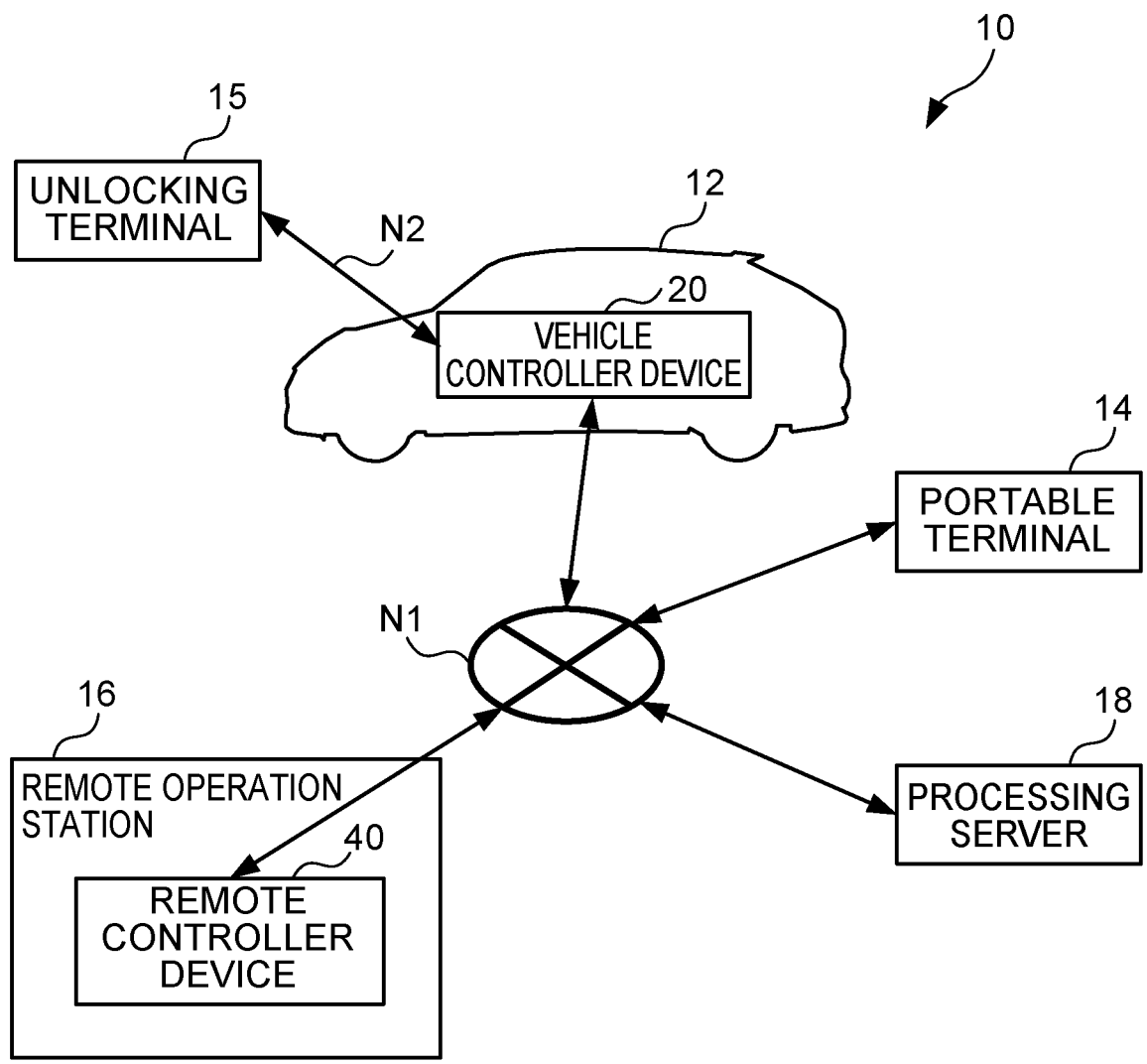
FIG. 1 is a diagram illustrating schematic configuration of a vehicle control system according to a first exemplary embodiment.

FIG. 1 is a block diagram illustrating a schematic configuration of a vehicle control system 10 according to a first exemplary embodiment.

Outline

As illustrated in FIG. 1, the vehicle control system 10 according to the first exemplary embodiment is configured including a vehicle 12, this being an autonomous driving-enabled vehicle, a portable terminal 14, an unlocking terminal 15, a remote operation station 16 serving as an operation device, and a processing server 18.

The vehicle 12 of the present exemplary embodiment includes a vehicle controller device 20, and the remote operation station 16 includes a remote controller device 40. In the vehicle control system 10, the vehicle controller device 20, the remote controller device 40, the portable terminal 14, and the processing server 18 are connected to one another through a network N1. The vehicle controller device 20 has a direct connection to the unlocking terminal 15 over a line N2.

The portable terminal 14 of the present exemplary embodiment is a communication terminal in the possession of a user of the vehicle 12, and for example corresponds to a smartphone or a tablet. The unlocking terminal 15 of the present exemplary embodiment is a communication terminal in the possession of a person outside the vehicle, and for example corresponds to a smartphone or a tablet. The unlocking terminal 15 serving as a communication terminal is capable of unlocking the vehicle 12 using an authentication code acquired from the processing server 18. Note that the unlocking terminal 15 may include a dedicated remote control key for the vehicle 12, this being a portable device for unlocking the vehicle 12.

Although FIG. 1 only illustrates one of each of the vehicle 12, the portable terminal 14, the unlocking terminal 15, the remote operation station 16, and the processing server 18, the vehicle control system 10 may include plural of each.

Vehicle

The vehicle 12 is configured so as to be capable of implementing autonomous driving in which the vehicle 12 travels independently by the vehicle controller device 20 based on a pre-generated travel plan, remote driving based on operation of the remote operation station 16 by a remote driver, and manual driving based on operation by an occupant of the vehicle 12 (namely, a driver).

Figure 2:
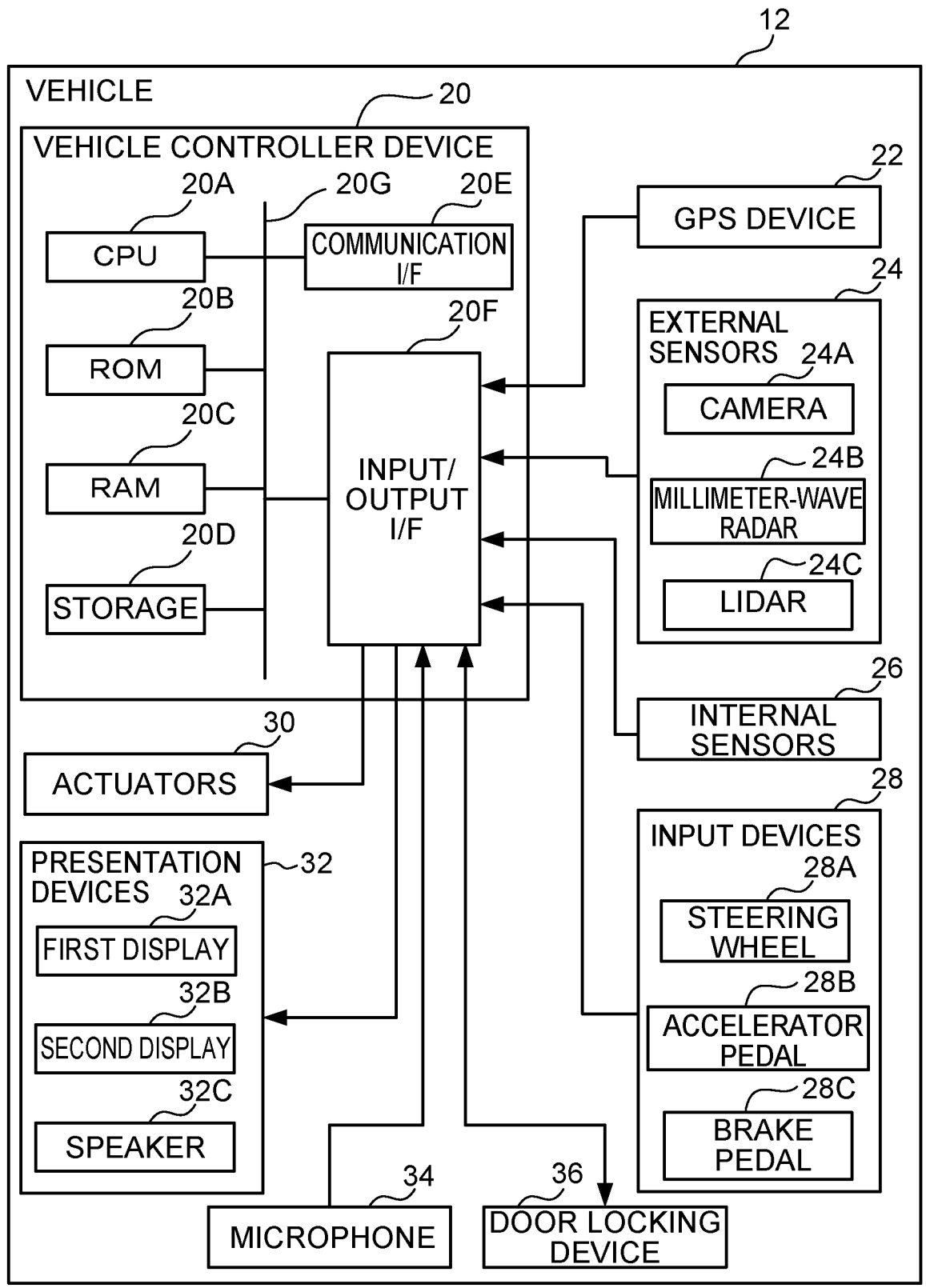
FIG. 2 is a block diagram illustrating hardware configuration of a vehicle of the first exemplary embodiment.

FIG. 2 is a block diagram illustrating hardware configuration of equipment installed in the vehicle 12 of the present exemplary embodiment. In addition to the vehicle controller device 20 described above, the vehicle 12 includes a global positioning system (GPS) device 22, external sensors 24, internal sensors 26, input devices 28, actuators 30, presentation devices 32, a microphone 34, and a door locking device 36.

The vehicle controller device 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E and the input/output I/F 20F are connected together so as to be capable of communicating with each other through a bus 20G The CPU 20A is an example of a processor, and the RAM 20C is an example of memory.

The CPU 20A is a central processing unit that executes various programs and controls various sections. Namely, the CPU 20A reads a program from the ROM 20B and executes the program, using the RAM 20C as a workspace. In the present exemplary embodiment, an execution program is stored in the ROM 20B. The CPU 20A executes the execution program to cause the vehicle controller device 20 to function as a position acquisition section 200, a peripheral information acquisition section 210, a vehicle information acquisition section 220, a travel plan generation section 230, an operation reception section 240, a travel control section 250, an identifying information acquisition section 260, a presentation section 270, an authentication section 280, and a notification section 290, respectively illustrated in FIG. 4.

As illustrated in FIG. 2, the ROM 20B stores various programs and various data. The RAM 20C serves as a workspace to temporarily store the programs or data.

The storage 20D serves as a storage section configured by a hard disk drive (HDD) or a solid state drive (SSD), and stores various programs including an operating system, as well as various data. Identifying information of a user and a unique authentication code of the vehicle 12, described later, are stored in the storage 20D.

The communication I/F 20E serves as a communication section, and includes an interface for connecting to the network N1 in order to communicate with the remote controller device 40, the portable terminal 14, the processing server 18, and so on. A communication protocol such as LTE or Wi-Fi (registered trademark) is employed for this interface. The communication I/F 20E also includes a communication device for direct communication with the unlocking terminal 15 using wireless communication or infrared communication over the line N2.

The communication I/F 20E of the present exemplary embodiment transmits images captured by a camera 24A to the remote operation station 16 located externally to the vehicle 12 through the network N1, and receives remote operation information, this being operation information to operate the vehicle 12, from the remote operation station 16 through the network N1. The communication I/F 20E also receives identifying information of the user from the processing server 18 through the network N1. The identifying information includes a facial image, information such as a name, and audio information relating to the user.

The input/output I/F 20F is an interface for communicating with the various devices installed in the vehicle 12. In the vehicle controller device 20 of the present exemplary embodiment, the GPS device 22, the external sensors 24, the internal sensors 26, the input devices 28, the actuators 30, the presentation devices 32, the microphone 34, and the door locking device 36 are connected through the input/output I/F 20F. Note that the GPS device 22, the external sensors 24, the internal sensors 26, the input devices 28, the actuators 30, the presentation devices 32, the microphone 34, and the door locking device 36 may be directly connected to the bus 20G.

The GPS device 22 is a device for measuring the current position of the vehicle 12. The GPS device 22 includes an antenna to receive signals from GPS satellites.

The external sensors 24 serve as a peripheral information detection section, and are a group of sensors that detect peripheral information from around the periphery of a vehicle body 80 of the vehicle 12. The external sensors 24 include the camera 24A that captures a predetermined range, millimeter-wave radar 24B that transmits scanning waves over a predetermined range and picks up reflected waves, and laser imaging detection and ranging (LIDAR) 24C that scans a predetermined range. The various external sensors 24 are installed at various locations on the vehicle body 80.

The internal sensors 26 are a group of sensors that detect travel states of the vehicle 12. The internal sensors 26 include at least one out of a vehicle speed sensor, an acceleration sensor, and a yaw rate sensor.

The input devices 28 are a group of switches to be operated by an occupant on board the vehicle 12. The input devices 28 include a steering wheel 28A serving as a switch to steer the steered wheels of the vehicle 12, an accelerator pedal 28B serving as a switch to cause the vehicle 12 to accelerate, and a brake pedal 28C serving as a switch to cause the vehicle 12 to decelerate.

The actuators 30 serve as a travel device, and include a steering wheel actuator to drive the steered wheels of the vehicle 12, an accelerator actuator to control acceleration of the vehicle 12, and a brake actuator to control deceleration of the vehicle 12.

Figure 3:
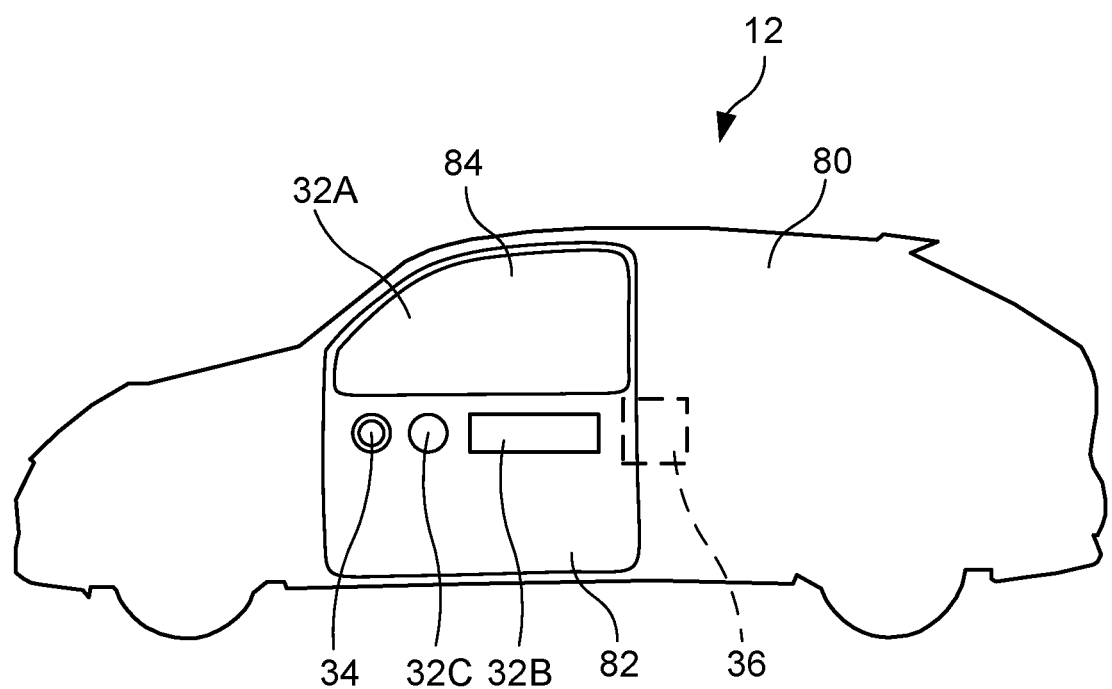
FIG. 3 is a diagram illustrating a layout of presentation devices on a vehicle of the first exemplary embodiment.

The presentation devices 32 are a group of devices for presenting the identifying information at the vehicle exterior. As illustrated in FIG. 3, the presentation devices 32 include a first display 32A, this being a transparent display provided to a side window 84, a second display 32B, this being a liquid crystal display provided to a side door 82, and a speaker 32C provided to the side door 82. Out of the identifying information, a facial image of the user is displayed on the first display 32A. Out of the identifying information, text relating to the name of the user is displayed on the second display 32B. Out of the identifying information, audio of the user is output from the speaker 32C.

The microphone 34 is a sound pickup device for acquiring audio from outside the vehicle. The microphone 34 is provided adjacent to the speaker 32C on the side door 82. In the vehicle 12 of the present exemplary embodiment, a person outside the vehicle is able to converse with the user of the vehicle 12 using the speaker 32C and the microphone 34 provided to the vehicle exterior.

The door locking device 36 serves as a locking section, and is capable of locking and unlocking the side door 82, serving as a door section. The door locking device 36 includes a locking mechanism for locking the side door 82 and an actuator to drive the locking mechanism. Being "locked" by the door locking device 36 refers to a state in which the side door 82 is locked, and being "unlocked" by the door locking device 36 refers to a state in which the side door 82 is unlocked.

Figure 4:
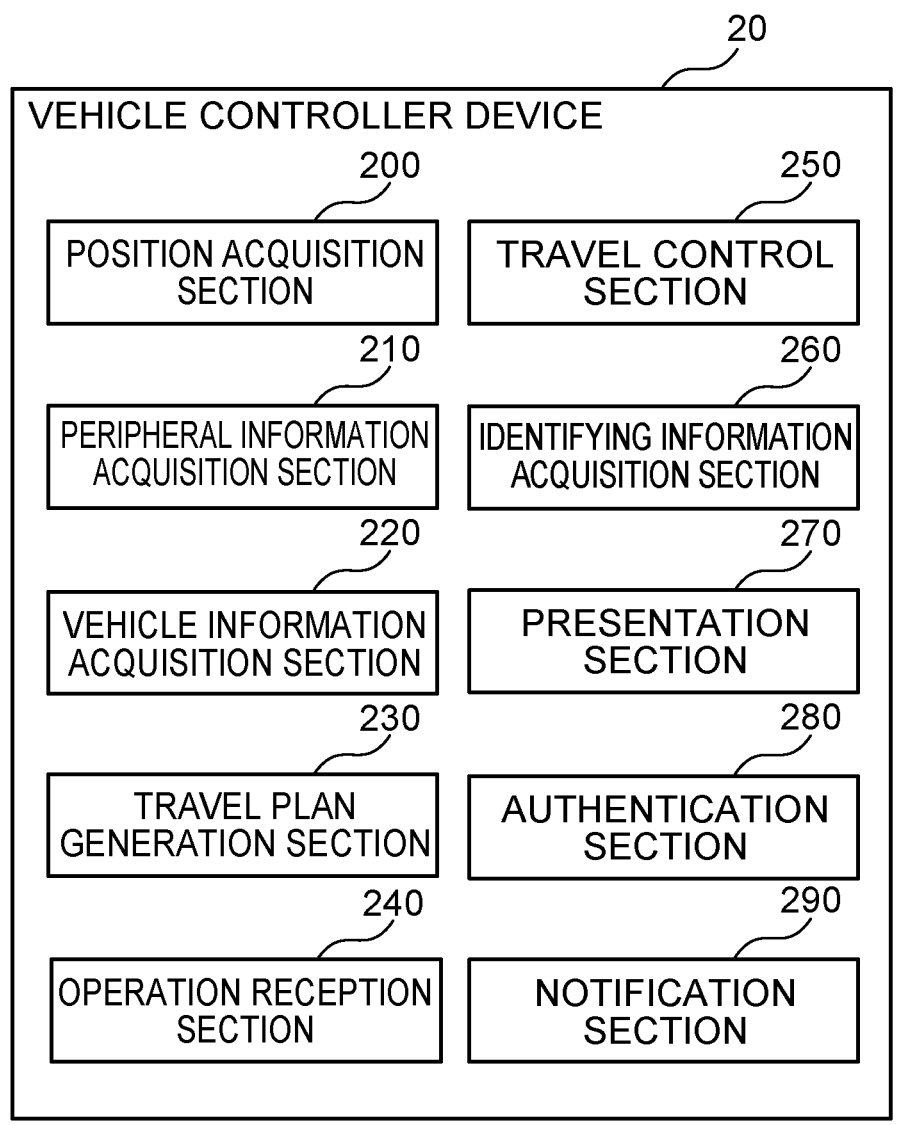
FIG. 4 is a block diagram illustrating an example of functional configuration of a vehicle controller device of the first exemplary embodiment.

FIG. 4 is a block diagram illustrating an example of functional configuration of the vehicle controller device 20. As illustrated in FIG. 4, the vehicle controller device 20 includes the position acquisition section 200, the peripheral information acquisition section 210, the vehicle information acquisition section 220, the travel plan generation section 230, the operation reception section 240, the travel control section 250, the identifying information acquisition section 260, the presentation section 270, the authentication section 280, and the notification section 290. Each of the functional configurations is implemented by the CPU 20A reading the execution program stored in the ROM 20B and executing this program.

The position acquisition section 200 includes functionality to acquire the current position of the vehicle 12. The position acquisition section 200 acquires position information from the GPS device 22 through the input/output I/F 20F.

The peripheral information acquisition section 210 serves as an acquisition section, and includes functionality to acquire peripheral information from the periphery of the vehicle 12. The peripheral information acquisition section 210 acquires peripheral information regarding the vehicle 12 from the external sensors 24 through the input/output I/F 20F. The "peripheral information" includes not only information regarding other vehicles and pedestrians in the periphery of the vehicle 12, but also regarding the weather, brightness, road width, obstacles, and so on.

The vehicle information acquisition section 220 includes functionality to acquire vehicle information such as the vehicle speed, acceleration, yaw rate, and so on of the vehicle 12. The vehicle information acquisition section 220 acquires the vehicle information regarding the vehicle 12 from the internal sensors 26 through the input/output I/F 20F.

The travel plan generation section 230 includes functionality to generate a travel plan to cause the vehicle 12 to travel based on the position information acquired by the position acquisition section 200, the peripheral information acquired by the peripheral information acquisition section 210, and the vehicle information acquired by the vehicle information acquisition section 220. The travel plan includes not only a travel route to a pre-set destination, but also information regarding a course to avoid obstacles ahead of the vehicle 12, the speed of the vehicle 12, and so on.

The operation reception section 240 includes functionality to receive signals output from the various input devices 28 when manual driving is being performed based on operation by the occupant of the vehicle 12. The operation reception section 240 also generates vehicle operation information, this being operation information used to control the actuators 30, based on the signals received from the various input devices 28.

The travel control section 250 includes functionality to control autonomous driving based on the travel plan generated by the travel plan generation section 230, remote driving based on the remote operation information received from the remote operation station 16, and manual driving based on the vehicle operation information received from the operation reception section 240. The autonomous driving, remote driving, and manual driving are implemented by the travel control section 250 controlling the actuators 30.

The identifying information acquisition section 260 includes functionality to acquire identifying information from the processing server 18 through the communication I/F 20E. The identifying information acquisition section 260 stores the acquired identifying information in the storage 20D.

The presentation section 270 includes functionality to present by outputting the identifying information to the respective presentation devices 32. Namely, the presentation section 270 outputs a facial image of the user to the first display 32A, outputs textual information relating to the name of the user to the second display 32B, and outputs audio information of the user to the speaker 32C.

The authentication section 280 includes functionality to perform authentication to unlock the side door 82. In the present exemplary embodiment, the authentication section 280 determines authentication to be successful in cases in which an authentication code acquired from the unlocking terminal 15 matches the authentication code stored in the ROM 20B or the storage 20D. The authentication section 280 operates the door locking device 36 to unlock the side door 82 in cases in which authentication has been determined to be successful. This enables a person outside the vehicle to open and close the side door 82.

The notification section 290 includes functionality to acquire a dispatch destination from the portable terminal 14 in the possession of the user, and to notify the portable terminal 14 of completion in cases in which a person outside the vehicle has boarded or loaded a package at the dispatch destination. The dispatch destination is an example of a designated location.

Remote Operation Station

Figure 5:
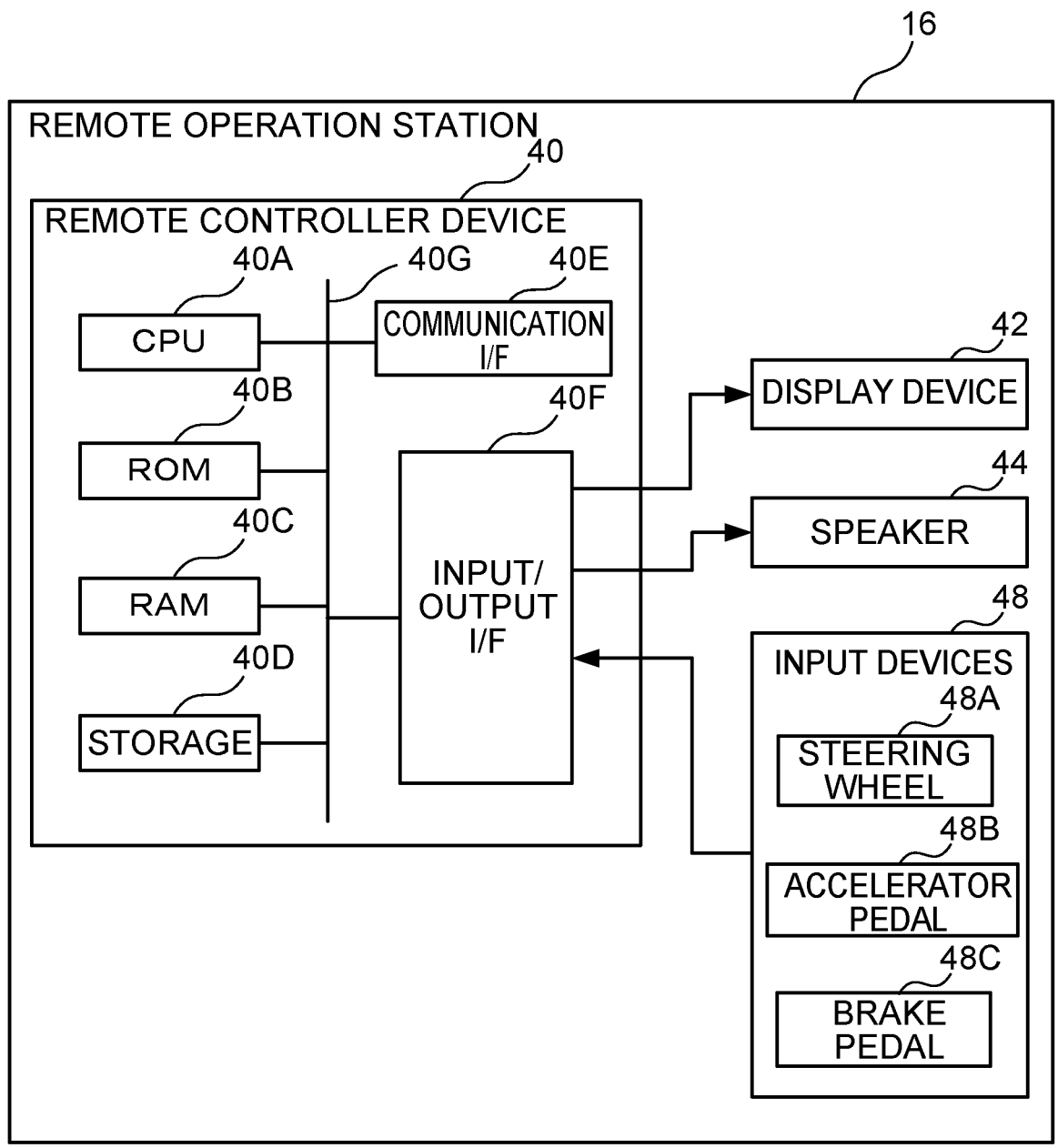
FIG. 5 is a block diagram illustrating hardware configuration of a remote operation station of the first exemplary embodiment.

FIG. 5 is a block diagram illustrating hardware configuration of equipment installed in the remote operation station 16 of the present exemplary embodiment. The remote operation station 16 includes the remote controller device 40 described above, as well as a display device 42, a speaker 44, and input devices 48.

The remote controller device 40 is configured including a CPU 40A, ROM 40B, RAM 40C, storage 40D, a communication I/F 40E and an input/output I/F 40F. The CPU 40A, the ROM 40B, the RAM 40C, the storage 40D, the communication I/F 40E, and the input/output I/F 40F are connected together so as to be capable of communicating with each other through a bus 40G. Functionality of the CPU 40A, the ROM 40B, the RAM 40C, the storage 40D, the communication I/F 40E, and the input/output I/F 40F matches that of the CPU 20A, the ROM 20B, the RAM 20C, the storage 20D, the communication I/F 20E, and the input/output I/F 20F of the vehicle controller device 20 previously described.

Figure 6:
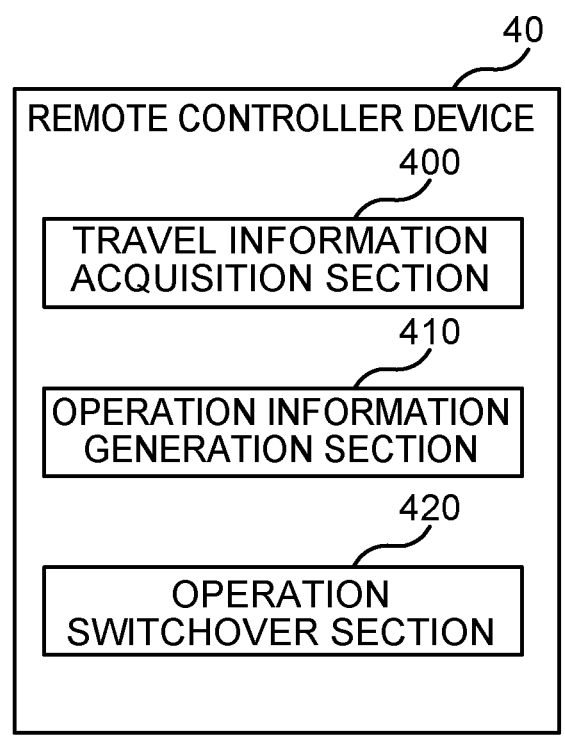
FIG. 6 is a block diagram illustrating an example of functional configuration of a remote controller device of the first exemplary embodiment.

The CPU 40A reads a program from the ROM 40B and executes the program, using the RAM 40C as a workspace. In the present exemplary embodiment, a processing program is stored in the ROM 40B. When the CPU 40A executes the processing program, the remote controller device 40 functions as a travel information acquisition section 400, an operation information generation section 410, and an operation switchover section 420, as illustrated in FIG. 6.

The display device 42, the speaker 44, and the input devices 48 are connected to the remote controller device 40 of the present exemplary embodiment through the input/output I/F 40F. Note that the display device 42, the speaker 44, and the input devices 48 may be directly connected to the bus 40G.

The display device 42 is a liquid crystal monitor for displaying an image captured by the camera 24A of the vehicle 12 and various information relating to the vehicle 12.

The speaker 44 is a speaker for replaying audio recorded by a microphone attached to the camera 24A of the vehicle 12 together with the captured image, as well as audio recorded by the microphone 34.

The input devices 48 are controllers to be operated by a remote driver serving as a remote operator using the remote operation station 16. The input devices 48 include a steering wheel 48A serving as a switch to steer the steered wheels of the vehicle 12, an accelerator pedal 48B serving as a switch to cause the vehicle 12 to accelerate, and a brake pedal 48C serving as a switch to cause the vehicle 12 to decelerate. Note that the modes of the respective input devices 48 are not limited thereto. For example, a lever switch may be provided instead of the steering wheel 48A. As another example, push button switches or lever switches may be provided instead of the pedal switches of the accelerator pedal 48B and the brake pedal 48C.

FIG. 6 is a block diagram illustrating an example of functional configuration of the remote controller device 40. As illustrated in FIG. 6, the remote controller device 40 includes the travel information acquisition section 400, the operation information generation section 410, and the operation switchover section 420.

The travel information acquisition section 400 includes functionality to acquire audio as well as captured images from the camera 24A and vehicle information such as the vehicle speed transmitted by the vehicle controller device 20. The acquired captured image and vehicle information are displayed on the display device 42 and the audio information is output through the speaker 44.

The operation information generation section 410 includes functionality to receive signals output from the various input devices 48 when remote driving is being performed based on operation by the remote driver. The operation information generation section 410 also generates remote operation information to be transmitted to the vehicle controller device 20 based on the signals received from the various input devices 48.

The operation switchover section 420 includes functionality to start remote operation by the remote driver. For example, the operation switchover section 420 starts remote operation in cases in which an operation start command has been acquired from the processing server 18. The vehicle controller device 20 then starts remote driving of the vehicle 12 having acquired a driving start command from the processing server 18. Alternatively, for example, the operation switchover section 420 starts remote operation in cases in which an operation start command has been acquired from the vehicle controller device 20. The vehicle controller device 20 that transmitted the operation start command then starts remote driving of the vehicle 12.

Processing Server

Figure 7:
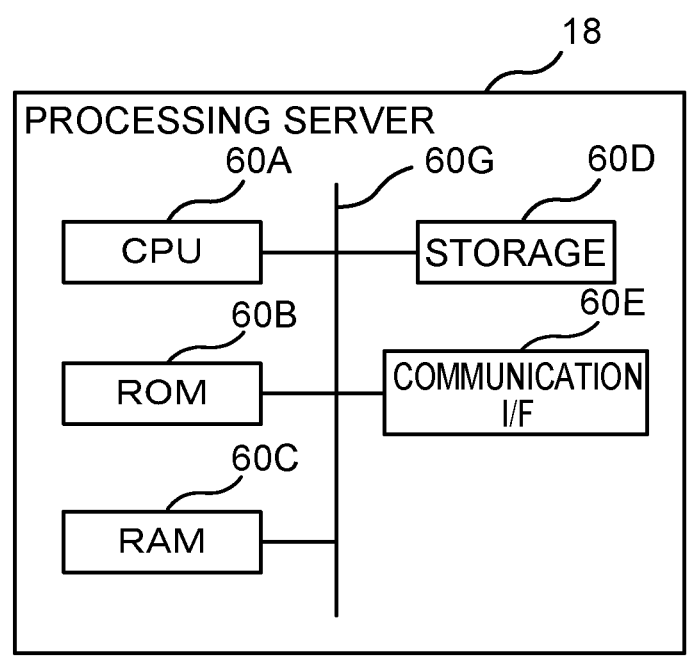
FIG. 7 is a block diagram illustrating hardware configuration of a processing server of the first exemplary embodiment.

As illustrated in FIG. 7, the processing server 18 is configured including a CPU 60A, ROM 60B, RAM 60C, storage 60D, and a communication I/F 60E. The CPU 60A, the ROM 60B, the RAM 60C, the storage 60D, and the communication I/F 60E are connected together so as to be capable of communicating with each other through a bus 60G. Functionality of the CPU 60A, the ROM 60B, the RAM 60C, the storage 60D, and the communication I/F 60E matches that of the CPU 20A, the ROM 20B, the RAM 20C, the storage 20D, and the communication I/F 20E of the vehicle controller device 20 previously described.

The CPU 60A reads a program from the ROM 60B or the storage 60D, and executes the program, using the RAM 60C as a workspace. In the present exemplary embodiment, an information processing program is stored in the storage 60D. By executing the information processing program, the CPU 60A functions as an identifying information gathering section 600, an identifying information supply section 610, and a vehicle dispatch processing section 620, illustrated in FIG. 8.

Figure 8:
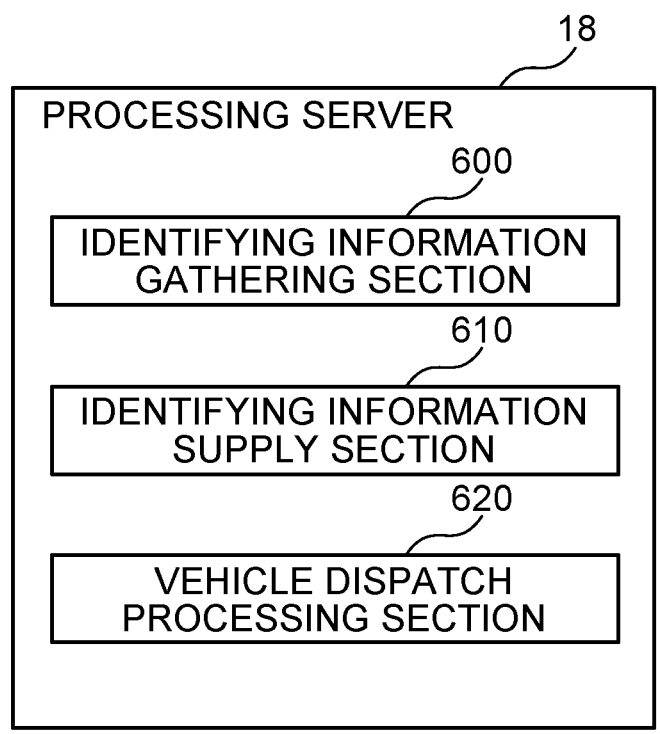
FIG. 8 is a block diagram illustrating an example of functional configuration of a processing server of the first exemplary embodiment.

FIG. 8 is a block diagram illustrating an example of functional configuration of the processing server 18. As illustrated in FIG. 8, the processing server 18 includes the identifying information gathering section 600, the identifying information supply section 610, and the vehicle dispatch processing section 620.

The identifying information gathering section 600 includes functionality to acquire identifying information relating to the user of the vehicle 12 from outside the processing server 18. The identifying information acquired by the identifying information gathering section 600 is stored in the storage 60D together with a user ID and password corresponding to the identifying information.

The identifying information supply section 610 includes functionality to transmit the identifying information of a user to the vehicle controller device 20 of the vehicle 12 used by the user. For example, in cases in which a request for a vehicle dispatch is made by the portable terminal 14 in the possession of a user, when the vehicle dispatch processing section 620, described below, has chosen a vehicle 12 to be dispatched, the identifying information supply section 610 transmits the identifying information to the vehicle controller device 20 of the vehicle 12 to be dispatched.

The vehicle dispatch processing section 620 includes functionality to select a vehicle 12 to be dispatched from out of plural vehicles 12. The vehicle dispatch processing section 620 also includes functionality to select a remote operation station 16 to remotely operate the vehicle 12 in cases in which the vehicle 12 to be dispatched is to be remotely driven. The vehicle dispatch processing section 620 selects a vehicle 12 to be dispatched, and the vehicle dispatch processing section 620 also transmits a driving start command to the vehicle controller device 20 of the selected vehicle 12 in cases in which the vehicle 12 is to be remotely driven, and transmits an operation start command to the remote controller device 40.

Operation

In the vehicle control system 10 of the present exemplary embodiment, the vehicle 12 dispatched in response to a user request is capable of transporting a passenger or a package by remote driving or autonomous driving. For example, in a case in which a parent whose child is at a nursery orders a vehicle dispatch, the dispatched vehicle 12 is able to go to the nursery to collect the child and take the child home. In such a case, the parent corresponds to the user.

Note that in cases in which the vehicle 12 is remotely driven or autonomously driven and the parent corresponding to the user is not on board the vehicle 12, it is difficult for the child to judge whether they should board the vehicle 12, or difficult for a caretaker at the nursery to judge whether they should allow the child to board the vehicle 12. In cases in which the vehicle 12 is a car-share vehicle that is not owned by the parent, this judgement becomes even more difficult.

In the present exemplary embodiment, presenting the identifying information of the user of the vehicle 12 at the vehicle exterior enables a person outside the vehicle to identify the user. Explanation follows regarding a control flow of the vehicle control system 10 of the present exemplary embodiment.

Figure 9:
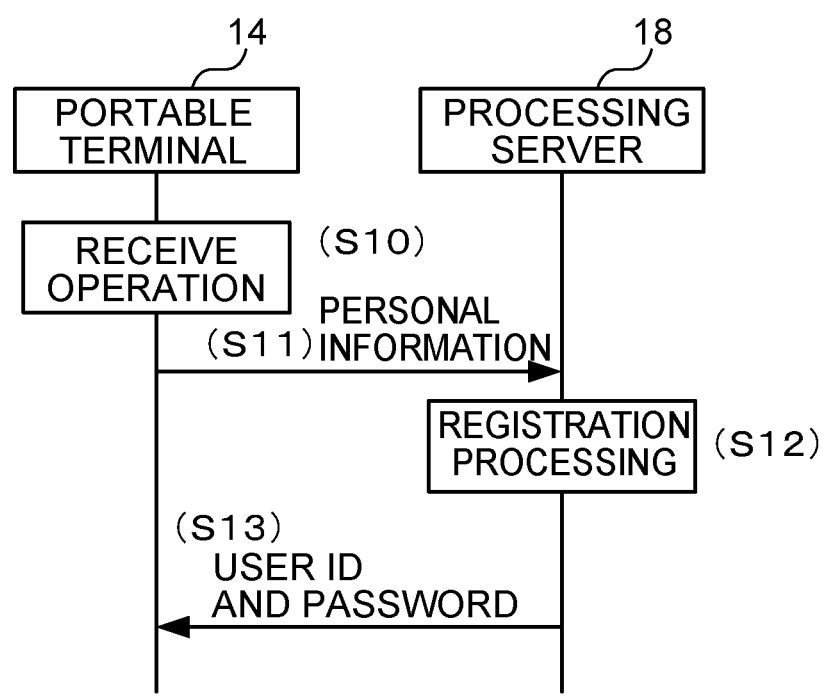
FIG. 9 is a sequence diagram to explain a flow of user registration processing in the first exemplary embodiment.

First, explanation follows regarding a flow of user registration processing by the vehicle control system 10 of the present exemplary embodiment, with reference to the sequence diagram in FIG. 9.

At step S10 in FIG. 9, the portable terminal 14 in the possession of the user receives operation from the user. In this operation, the user starts up an application pre-installed in the portable terminal 14, inputs personal information such as their name, and attaches an image of their face. The user then presses a register button displayed on a screen of the portable terminal 14 to complete receipt of the operation.

At step S11, the portable terminal 14 transmits the personal information received at step S10 to the processing server 18.

At step S12, the CPU 60A of the processing server 18 executes registration processing. In the registration processing, the CPU 60A issues an ID and password for the user, and stores the personal information corresponding to the issued ID in the storage 60D as identifying information.

At step S13, the CPU 60A transmits the ID and password issued during the registration processing to the portable terminal 14. Namely, the user is notified thereof.

Figure 10:
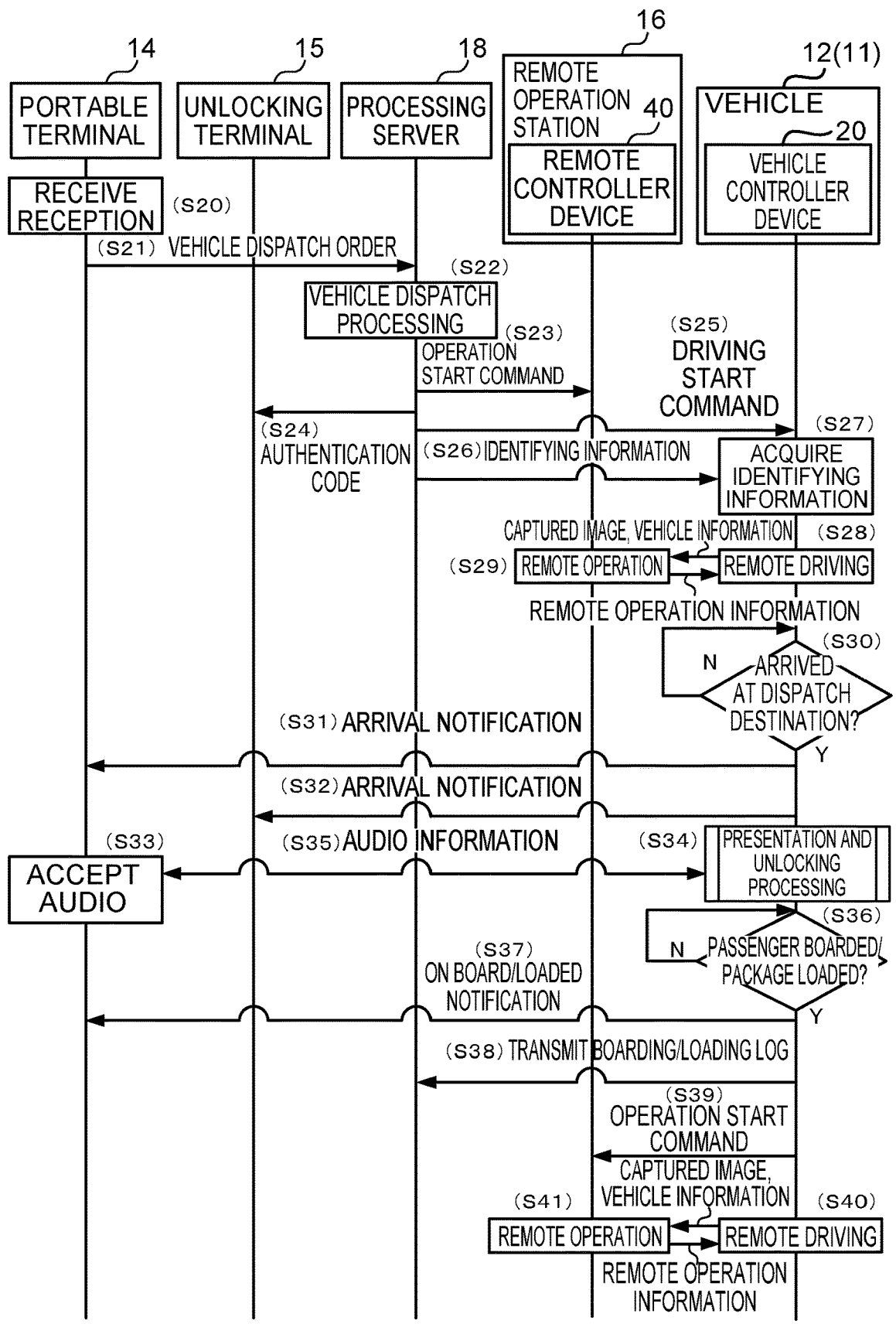
FIG. 10 is a sequence diagram to explain a flow of transportation by a vehicle in the first exemplary embodiment.

Next, explanation follows regarding a flow of processing by the vehicle control system 10 of the present exemplary embodiment when the user uses a vehicle 12 for transportation, with reference to the sequence diagram in FIG. 10.

At step S20 in FIG. 10, the portable terminal 14 in the possession of the user receives operation from the user. In this operation, the user starts up the application pre-installed in the portable terminal 14, and logs in using the ID and password issued during the registration processing. The user then designates a dispatch destination and a dispatch time for a vehicle 12 on the screen of the portable terminal 14. The user then presses an order button displayed on the screen of the portable terminal 14 to complete receipt of the operation.

At step S21, the portable terminal 14 transmits information regarding the dispatch destination and dispatch time received at step S20 to the processing server 18.

At step S22, the CPU 60A of the processing server 18 executes vehicle dispatch processing. In the vehicle dispatch processing, the CPU 60A selects a vehicle 12 to be used for transportation, and selects a remote operation station 16 to perform remote operation in cases in which the vehicle 12 is to be remotely driven.

At step S23, the CPU 60A transmits an operation start command to the remote controller device 40 of the remote operation station 16 that is to perform remote operation.

At step S24, the CPU 60A transmits an authentication code to unlock the vehicle 12 selected during the vehicle dispatch processing to the unlocking terminal 15.

At step S25, the CPU 60A transmits a driving start command to the vehicle controller device 20 of the vehicle 12 to be remotely driven.

At step S26, the CPU 60A transmits the identifying information of the user, more specifically the user corresponding to the ID used to order a vehicle dispatch, to the vehicle controller device 20 of the vehicle 12 that is to be remotely driven. Note that the identifying information may be transmitted together with the driving start command.

At step S27, the CPU 20A of the vehicle controller device 20 of the vehicle 12 receives the identifying information transmitted from the processing server 18. The received identifying information is temporarily stored in the storage 20D.

At step S28, the CPU 20A of the vehicle controller device 20 of the vehicle 12 starts remote driving. At step S29, the CPU 40A of the remote controller device 40 of the remote operation station 16 starts remote operation. Namely, the remote operation station 16 receives images captured by the camera 24A and vehicle information from the internal sensors 26 of the vehicle 12, and transmits remote operation information for controlling the vehicle 12 to the vehicle controller device 20 of the vehicle 12.

At step S30, the CPU 20A of the vehicle 12 determines whether or not the vehicle 12 has arrived at the designated dispatch destination. Processing proceeds to the next step S31 in cases in which the vehicle has arrived at the dispatch destination. Note that the CPU 20A may determine the vehicle 12 to have arrived when the vehicle 12 has come within a predetermined range of the dispatch destination.

At step S31, the CPU 20A of the vehicle 12 transmits an arrival notification indicating the arrival of the vehicle 12 to the portable terminal 14 of the user.

At step S32, the CPU 20A of the vehicle 12 transmits an arrival notification indicating the arrival of the vehicle 12 to the unlocking terminal 15 in the possession of a person outside the vehicle 12 who will unlock the vehicle 12. In the case of the above-described example of collecting a child, the unlocking terminal 15 may be in the possession of the child who is to board the vehicle 12, or in the possession of a caretaker who is seeing off the child. When the unlocking terminal 15 acquires the arrival notification, the holder thereof is able to verify that the vehicle 12 has arrived and move from indoors to the vicinity of the vehicle 12.

At step S33, the portable terminal 14 in the possession of the user accepts audio from the user. Namely, the portable terminal 14 becomes capable of receiving the voice of the user.

At step S34, the CPU 20A of the vehicle 12 executes presentation and unlocking processing. In the presentation and unlocking processing, the identifying information of the user is presented to the person outside the vehicle, and authentication is performed based on predetermined information, whereupon the door locking device 36 unlocks the side door 82. Note that the presentation and unlocking processing is described in detail later.

At step S35, audio information is exchanged both ways between the portable terminal 14 accepting audio and the vehicle controller device 20 executing the presentation and unlocking processing. Namely, the portable terminal 14 transmits audio information relating to the audio accepted at step S33 to the vehicle controller device 20. The vehicle controller device 20 transmits audio information relating to audio acquired from the microphone 34 during the presentation and unlocking processing at step S34 to the portable terminal 14. The user in the possession of the portable terminal 14 and the person outside the vehicle 12 are thereby able to converse.

At step S36, the CPU 20A of the vehicle 12 determines whether or not at least one out of a passenger boarding or package loading has been performed. Processing proceeds to the next step S37 in cases in which the CPU 20A determines that at least one out of a passenger boarding or package loading has been performed.

At step S37, the CPU 20A of the vehicle 12 transmits an on board/loaded notification, indicating that passenger boarding or package loading is complete, to the portable terminal 14 of the user.

At step S38, the CPU 20A of the vehicle 12 transmits a log of the time and location where the passenger boarded the vehicle, or the time and location where the package was loaded, to the processing server 18.

At step S39, the CPU 20A of the vehicle 12 transmits an operation start command to the remote controller device 40.

At step S40, the CPU 20A of the vehicle controller device 20 of the vehicle 12 resumes remote driving. At step S41, the CPU 40A of the remote controller device 40 of the remote operation station 16 starts remote operation. Namely, the remote operation station 16 receives images captured by the camera 24A and vehicle information from the internal sensors 26 of the vehicle 12, and transmits remote operation information for controlling the vehicle 12 to the vehicle controller device 20 of the vehicle 12.

Figure 11:
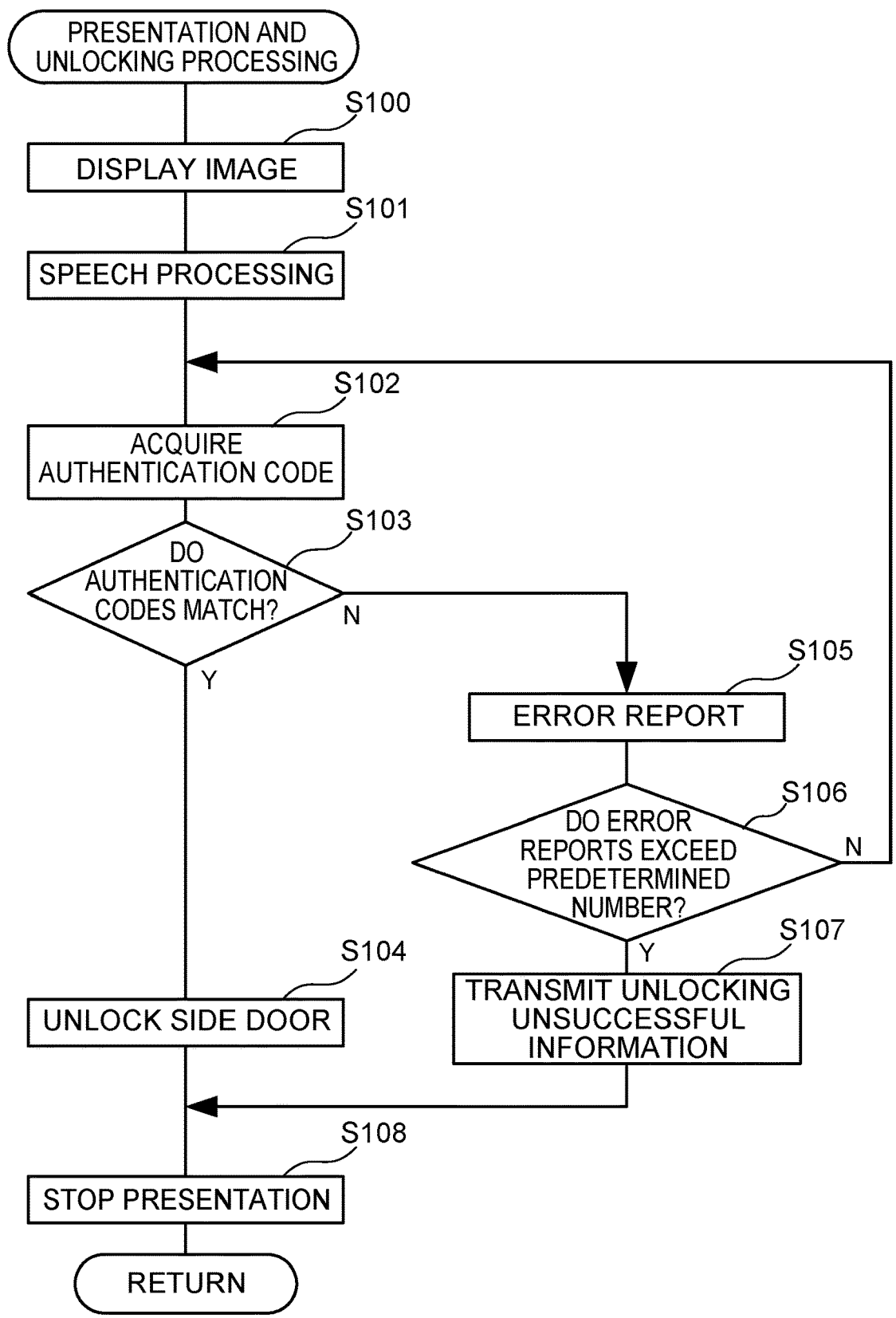
FIG. 11 is a flowchart to explain a flow of presentation and unlocking processing of the first exemplary embodiment.

Next, explanation follows regarding a flow of the presentation and unlocking processing executed by the vehicle controller device 20, with reference to the flowchart in FIG. 11.

At step S100 in FIG. 11, the CPU 20A displays images relating to the identifying information stored in the storage 20D on the presentation devices 32. Specifically, of the identifying information, the CPU 20A displays a facial image of the user on the first display 32A, and displays a textual image such as the name or a nickname of the user on the second display 32B. Thus, in cases in which a child is being collected, for example, the person (the child or their caretaker) outside the vehicle is able to perceive that the vehicle 12 dispatched by the parent, corresponding to the user, has arrived. Alternatively, for example, in cases in which a package is being transported, the person outside the vehicle is able to perceive that the vehicle 12 dispatched by the package recipient, corresponding to the user, has arrived.

At step S101, the CPU 20A executes speech processing. Specifically, the CPU 20A outputs audio information acquired from the portable terminal 14 through the speaker 32C, and transmits information relating to audio picked up by the microphone 34 to the portable terminal 14. The user in the possession of the portable terminal 14 and the person outside the vehicle 12 are thereby able to converse.

At step S102, the CPU 20A acquires an authentication code from the unlocking terminal 15 through the communication I/F 20E.

At step S103, the CPU 20A performs a comparison to determine whether or not the authentication code acquired from the unlocking terminal 15 matches the unique authentication code of the vehicle 12 that is pre-stored in the storage 20D as a result of authentication processing. Processing proceeds to the next step S104 in cases in which the CPU 20A determines that the acquired authentication code matches the unique authentication code of the vehicle 12. Processing proceeds to step S105 in cases in which the CPU 20A determines that the acquired authentication code does not match the unique authentication code of the vehicle 12.

At step S104, the CPU 20A operates the door locking device 36 to unlock the side door 82. The side door 82 can thereby be opened and closed to allow a passenger to board or to allow a package to be loaded into the vehicle.

At step S105, the CPU 20A issues an error report indicating that authentication has failed. For example, the CPU 20A displays text such as "The authentication code does not match" on the second display 32B, and outputs an alarm sound through the speaker 32C.

At step S106, the CPU 20A determines whether or not the number of error reports has exceeded a predetermined number. Processing proceeds to the next step S107 in cases in which the CPU 20A determines that the number of error reports has exceeded the predetermined number. Processing returns to step S102 in cases in which the CPU 20A determines that the number of error reports has not yet exceeded the predetermined number. Namely, authentication is reattempted.

At step S107, the CPU 20A transmits information indicating that unlocking was unsuccessful to the portable terminal 14. The user in the possession of the portable terminal 14 is thereby made aware that passenger boarding or package loading was not possible.

At step S108, the CPU 20A stops presentation. Namely, the CPU 20A stops display of the facial image of the user on the first display 32A, and stops display of the textual image such as the name or nickname of the user on the second display 32B. The CPU 20A also ends the speech processing. The presentation and unlocking processing is thereby ended.

In the vehicle 12 of the present exemplary embodiment, the travel control section 250 is capable of executing autonomous driving and remote driving by controlling the actuators 30. Note that in the above-described processing example, when the user orders a vehicle dispatch (step S21), a vehicle 12 to be used for transportation is selected and a remote operation station 16 to perform remote operation is selected during the vehicle dispatch processing (step S22), and the vehicle 12 is remotely driven. However, there is no limitation thereto. For example, the vehicle 12 may be autonomously driven in cases in which it is not possible to select a remote operation station 16 to perform remote operation, such as when no remote operator is available. In such cases, the CPU 60A of the processing server 18 transmits a driving start command to start autonomous driving when the vehicle dispatch processing is being executed.

In the present exemplary embodiment, when a vehicle 12 performs transportation by autonomous driving or remote driving, identifying information such as the facial image and name of the user of the transportation service by the vehicle 12 is acquired from the processing server 18. The presentation devices 32 of the vehicle 12 then present the acquired identifying information at the vehicle exterior. Thus, in the present exemplary embodiment, the person outside the vehicle is able to identify the user who dispatched the vehicle 12, even in cases in which the user is not on board the vehicle 12. This enables the person outside the vehicle to ascertain whether or not to board or to load the package onto the vehicle.

The identifying information of the present exemplary embodiment includes the facial image of the user and the textual image such as the name or nickname of the user. The facial image of the user is displayed on the first display 32A, and the textual image such as the name or nickname of the user is displayed on the second display 32B in the vehicle 12. The vehicle 12 of the present exemplary embodiment thereby enables the person outside the vehicle to ascertain the user visually.

The identifying information of the present exemplary embodiment further includes audio information of the user of the vehicle 12. Outputting audio from the user through the speaker 32C of the vehicle 12 as identifying information enables the person outside the vehicle to ascertain the user aurally. Furthermore, conversation with the user is enabled through the speaker 32C and the microphone 34.

Note that providing the speaker 32C and the microphone 34 to the vehicle interior instead of, or in addition to, the vehicle exterior enables a passenger that has boarded the vehicle 12 to converse with the user of the vehicle 12. For example, in cases in which a child has been collected by the vehicle 12, the child is able to converse with a parent after having boarded. This enables the child to feel more at ease.

In the vehicle 12 of the present exemplary embodiment, the side door 82 locked by the door locking device 36 can be unlocked by performing authentication with the authentication section 280. The present exemplary embodiment thereby enables boarding of a passenger unconnected to the user or loading of a package unconnected to the user to be prevented.

Note that in cases in which the vehicle 12 is used to collect a child from a nursery or the like, if the parent corresponding to the user inputs schedule information when ordering a vehicle dispatch, the vehicle 12 can be dispatched to the location of the child at a timing when the parent is leaving work, and can take the child home at a timing when the parent has arrived home. In such cases, if the parent corresponding to the user pre-registers their schedule in the operation reception at step S20, the processing server 18 can instruct a vehicle 12 in accordance with this schedule.

Second Exemplary Embodiment

In the first exemplary embodiment, authentication is executed using the authentication code that is transmitted in advance to the unlocking terminal 15. However, in a second exemplary embodiment, authentication is executed using an image that is transmitted in advance from the unlocking terminal 15 to the vehicle 12. Explanation follows regarding points that differ from the first exemplary embodiment.

The authentication section 280 of the present exemplary embodiment determines authentication to be successful in cases in which a facial image of the person outside the vehicle acquired in advance from the unlocking terminal 15 matches an image captured by the camera 24A. In the first exemplary embodiment, after the vehicle dispatch processing in FIG. 10 (step S22) has ended, the unlocking terminal 15 receives the authentication code at step S24. In contrast thereto, in the present exemplary embodiment, a facial image of the person in possession of the unlocking terminal 15 is transmitted from the unlocking terminal 15 to the vehicle controller device 20.

Figure 12:
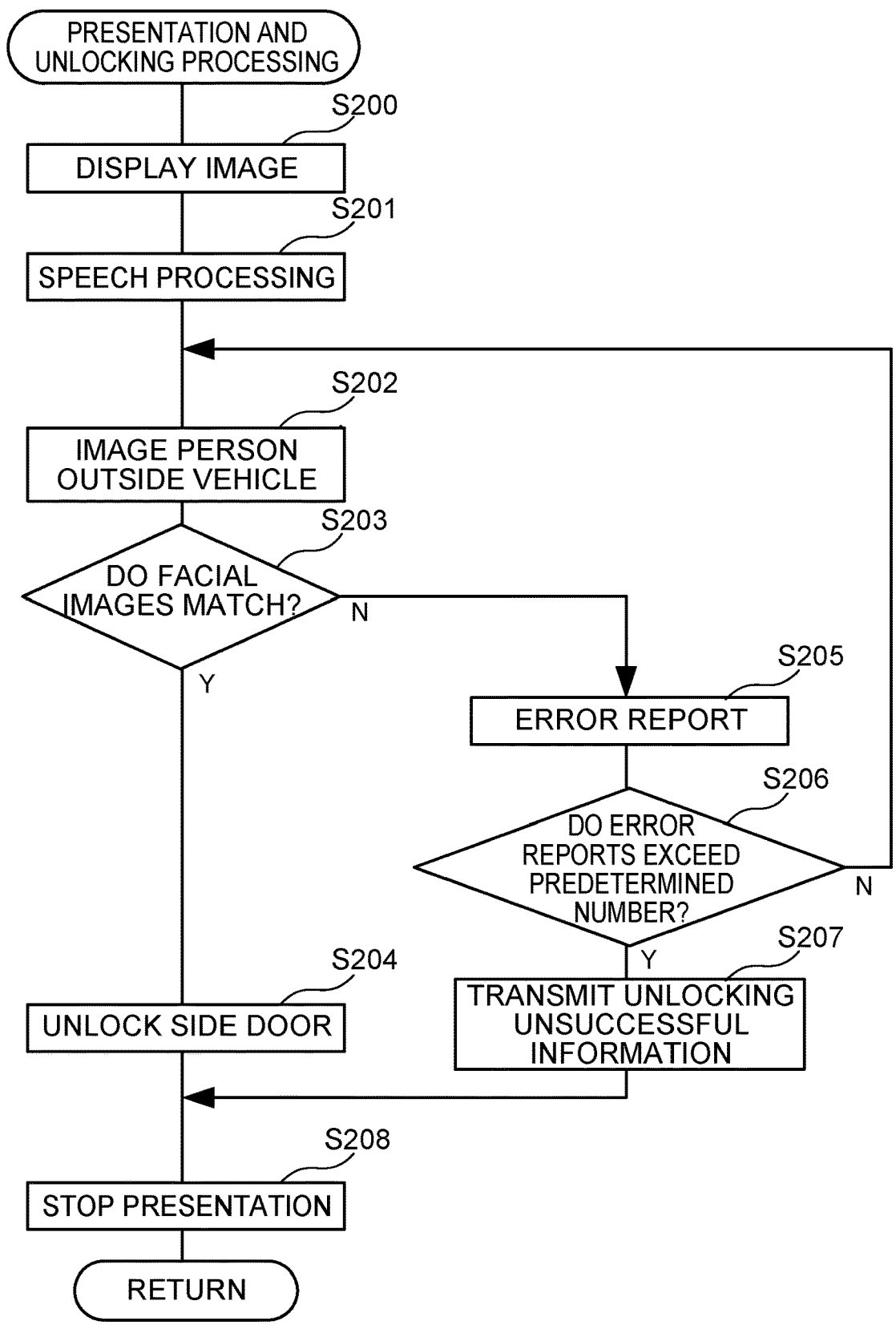
FIG. 12 is a flowchart to explain a flow of presentation and unlocking processing of a second exemplary embodiment.

Next, explanation follows regarding a flow of presentation and unlocking processing executed when the vehicle controller device 20 has acquired the facial image of the person outside the vehicle, with reference to the flowchart in FIG. 12.

The processing of step S200 and step S201 in FIG. 12 is the same as the processing of step S100 and step S101 of the first exemplary embodiment illustrated in FIG. 11, and so explanation thereof is omitted.

At step S202, the CPU 20A captures an image of a person outside the vehicle near to the side door 82 using the camera 24A.

At step S203, the CPU 20A performs a comparison to determine whether or not the facial image acquired from the unlocking terminal 15 matches the facial image included in the captured image as a result of authentication processing. Processing proceeds to the next step S204 in cases in which the CPU 20A determines that the acquired facial image matches the captured facial image. Processing proceeds to step S205 in cases in which the CPU 20A determines that the acquired facial image does not match the captured facial image.

The processing of step S204 to step S208 in FIG. 12 is the same as the processing of step S104 to step S108 of the first exemplary embodiment illustrated in FIG. 11, and so explanation thereof is omitted.

As described above, the present exemplary embodiment performs unlocking based on facial authentication, and exhibits similar operation and advantageous effects to those in the first exemplary embodiment.

Remarks

Note that the various processing executed by the CPU 20A, the CPU 40A, and the CPU 60A reading software (programs) in the exemplary embodiments described above may be executed by various processors other than CPUs.

Examples of such processors include programmable logic devices (PLDs) such as field-programmable gate arrays (FPGAs) that have a circuit configuration that can be modified following manufacture, or dedicated electrical circuits, these being processors such as application specific integrated circuits (ASICs) that have a custom designed circuit configuration to execute specific processing. The various processing may be executed using one of these processors, or may be executed by a combination of two or more processors of the same type or different types to each other (for example a combination of plural FPGAs, or a combination of a CPU and an FPGA). A more specific example of a hardware structure of these various processors is electric circuitry combining circuit elements such as semiconductor elements.

The exemplary embodiments described above describe a format in which the programs are stored (installed) in advance on a non-transitory computer-readable recording medium. For example, the execution program employed by the vehicle controller device 20 is stored in advance in the ROM 20B. The processing program employed by the remote controller device 40 is stored in advance in the ROM 40B. The information processing program employed by the processing server 18 is stored in advance in the storage 60D. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the respective programs may be configured in a format to be downloaded from an external device through a network.

The flows of processing in the exemplary embodiments described above are given as examples, and unnecessary steps may be omitted, new steps added, and the processing sequence rearranged within a range not departing from the spirit of the present disclosure.

What is claimed is:

1. A vehicle comprising:
    a communication device configured to receive operation information to operate a travel device installed in the vehicle from an external operation device;
    a memory;
    a processor coupled to the memory, the processor being configured to:
        receive a user request from a mobile user terminal including information for the vehicle to travel to an intermediate location and then travel to a destination, a passenger, different from a user transmitting the user request, boarding the vehicle at the intermediate location and traveling in the vehicle to the destination,
        acquire peripheral information regarding an environment peripheral to a vehicle body of the vehicle from a peripheral information sensor,
        generate a travel plan based on the peripheral information and the received user request, and
        control the travel device so as to perform autonomous driving in which travel is based on the generated travel plan, and perform remote driving in which travel is based on the operation information received by the communication device;
    an audio input/output device configured to output audio to an interior of the vehicle to the passenger and receive speech from the passenger while located in the vehicle to communicate to the user via the mobile user terminal using the communication device; and
    a presentation device provided to the vehicle body to display, at a vehicle exterior, identifying information received by the communication device, the identifying information relating to the passenger making use of the vehicle, the passenger being a person outside the vehicle at a time of viewing the presentation device, wherein
    the processor is further configured to transmit an arrival notification indicating arrival of the vehicle body to an unlocking terminal held by the passenger who is outside the vehicle and who intends to unlock a door provided at the vehicle body, and
    after transmitting the arrival notification to the unlocking terminal, the received identifying information relating to the passenger making use of the vehicle is displayed toward the outside the vehicle.

2. The vehicle of claim 1, wherein the presentation device starts to display the identifying information at the vehicle exterior when the vehicle has arrived at the intermediate location designated by the user request.

3. The vehicle of claim 2, wherein the processor is further configured to notify the mobile user terminal of completion, which is defined as when the passenger outside the vehicle has boarded onto the vehicle at the intermediate location.

4. The vehicle of claim 1, wherein the presentation device includes a display device configured to display a facial image of the passenger and a textual image of a nickname of the passenger as the identifying information.

5. The vehicle of claim 1, wherein the presentation device includes a speaker configured to output audio relating to the passenger as the identifying information.

6. The vehicle of claim 1, further comprising:
    an imaging device configured to capture an image outside the vehicle,
    wherein the processor performs authentication to cause a locking device, configured to lock and unlock a door provided at the vehicle body, to perform unlocking in a case in which an image acquired in advance matches the image captured by the imaging device.

7. The vehicle of claim 1, wherein the processor is configured to:
    transmit an onboard/loaded notification indicating that passenger boarding or package loading is complete to an unlocking terminal held by the passenger in response to a determination that at least one of the passenger boarding or package loading has been performed, and
    after transmitting the onboard/loaded notification to the unlocking terminal, restart the autonomous driving or the remote driving by controlling the travel device.

8. The vehicle of claim 7, wherein the processor is configured to transmit a log relating to a time and a location where the passenger boarded the vehicle or a log relating to a time and a location where a package was loaded into the vehicle.

* * * * *